(12) United States Patent
Rao

(10) Patent No.: US 8,438,602 B2
(45) Date of Patent: May 7, 2013

(54) SYSTEMS AND METHODS FOR LINKING MEDIA CONTENT

(75) Inventor: Padmanabha R. Rao, Palo Alto, CA (US)

(73) Assignee: Sling Media Inc., Foster City, CA (US)

( * ) Notice: Subject to any disclaimer, the term of this patent is extended or adjusted under 35 U.S.C. 154(b) by 413 days.

(21) Appl. No.: 12/359,784

(22) Filed: Jan. 26, 2009

(65) Prior Publication Data

US 2010/0192188 A1  Jul. 29, 2010

(51) Int. Cl.
*H04N 7/173* (2011.01)
(52) U.S. Cl.
USPC .............................. 725/89; 725/88; 709/219
(58) Field of Classification Search .............. 725/37–61, 725/87–118; 709/217–231
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,161,021 A | 11/1992 | Tsai | |
| 5,237,648 A | 8/1993 | Mills et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |
| 5,708,961 A | 1/1998 | Hylton et al. | |
| 5,710,605 A | 1/1998 | Nelson | |
| 5,722,041 A | 2/1998 | Freadman | |
| 5,757,416 A | 5/1998 | Birch et al. | |
| 5,774,170 A | 6/1998 | Hite et al. | |
| 5,778,077 A | 7/1998 | Davidson | |
| 5,794,116 A | 8/1998 | Matsuda et al. | |
| 5,822,537 A | 10/1998 | Katseff et al. | |
| 5,831,664 A | 11/1998 | Wharton et al. | |

(Continued)

FOREIGN PATENT DOCUMENTS

| CN | 1464685 | 12/2003 |
|---|---|---|
| DE | 4407319 A1 | 9/1994 |

(Continued)

OTHER PUBLICATIONS

USPTO, Final Office Action, mailed Nov. 6, 2009; U.S. Appl. No. 09/809,868, filed Mar. 15, 2001.

(Continued)

*Primary Examiner* — Annan Shang
(74) *Attorney, Agent, or Firm* — Ingrassia Fisher & Lorenz, P.C.

(57) ABSTRACT

Systems and methods are described for presenting a plurality of media clips to a viewer using a media player device. A first media clip is displayed on the media player, and an indicator corresponding to a second media clip is provided during playback of the first media clip. In response to the viewer selecting the indicator, playback of the first media clip is suspended, and information is stored about the first media clip on the media player device. The second media clip can then be subsequently displaying on the media player device. After displaying the second media clip, the stored information can be retrieved, and playback of the first media clip can resume from the point that playback was previously interrupted.

28 Claims, 2 Drawing Sheets

U.S. PATENT DOCUMENTS

| | | |
|---|---|---|
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,929,849 A * | 7/1999 | Kikinis ............ 725/113 |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,029,045 A * | 2/2000 | Picco et al. ............ 725/34 |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,144,375 A * | 11/2000 | Jain et al. ............ 715/251 |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,240,555 B1 * | 5/2001 | Shoff et al. ............ 725/110 |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,298,482 B1 * | 10/2001 | Seidman et al. ............ 725/101 |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,698,020 B1 * | 2/2004 | Zigmond et al. ............ 725/34 |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,127,735 B1 * | 10/2006 | Lee et al. ............ 725/87 |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 7,584,491 B2 * | 9/2009 | Bruckner et al. ............ 725/36 |
| 7,640,566 B1 * | 12/2009 | Taylor et al. ............ 725/88 |
| 7,836,149 B2 * | 11/2010 | Kikinis ............ 709/217 |
| 2001/0021974 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |

| | | | | | | |
|---|---|---|---|---|---|---|
| 2002/0138843 | A1 | 9/2002 | Samaan et al. | 2008/0059533 A1 | 3/2008 | Krikorian |
| 2002/0143973 | A1 | 10/2002 | Price | 2008/0134267 A1 | 6/2008 | Moghe et al. |
| 2002/0147634 | A1 | 10/2002 | Jacoby et al. | 2008/0195744 A1 | 8/2008 | Bowra et al. |
| 2002/0147687 | A1 | 10/2002 | Breiter et al. | 2008/0199150 A1 | 8/2008 | Candelore |
| 2002/0167458 | A1 | 11/2002 | Baudisch et al. | 2008/0294759 A1 | 11/2008 | Biswas et al. |
| 2002/0188818 | A1 | 12/2002 | Nimura et al. | 2008/0307456 A1 | 12/2008 | Beetcher et al. |
| 2002/0191575 | A1 | 12/2002 | Kalavade et al. | 2008/0307462 A1 | 12/2008 | Beetcher et al. |
| 2003/0001880 | A1 | 1/2003 | Holtz et al. | 2008/0307463 A1 | 12/2008 | Beetcher et al. |
| 2003/0028873 | A1 | 2/2003 | Lemmons | 2009/0074380 A1 | 3/2009 | Boston et al. |
| 2003/0065915 | A1 | 4/2003 | Yu et al. | 2009/0199248 A1 | 8/2009 | Ngo et al. |
| 2003/0093260 | A1 | 5/2003 | Dagtas et al. | 2010/0100915 A1 | 4/2010 | Krikorian et al. |
| 2003/0095791 | A1 | 5/2003 | Barton et al. | | | |
| 2003/0115167 | A1 | 6/2003 | Sharif et al. | | | |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 2003026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

Additional U.S. Patent Application Publications:

| | | | |
|---|---|---|---|
| 2003/0159143 | A1 | 8/2003 | Chan |
| 2003/0187657 | A1 | 10/2003 | Erhart et al. |
| 2003/0192054 | A1 | 10/2003 | Birks et al. |
| 2003/0208612 | A1 | 11/2003 | Harris et al. |
| 2003/0231621 | A1 | 12/2003 | Gubbi et al. |
| 2004/0003406 | A1 | 1/2004 | Billmaier |
| 2004/0052216 | A1 | 3/2004 | Roh |
| 2004/0068334 | A1 | 4/2004 | Tsai et al. |
| 2004/0083301 | A1 | 4/2004 | Murase et al. |
| 2004/0100486 | A1 | 5/2004 | Flamini et al. |
| 2004/0103340 | A1 | 5/2004 | Sundareson et al. |
| 2004/0139047 | A1 | 7/2004 | Rechsteiner et al. |
| 2004/0162845 | A1 | 8/2004 | Kim et al. |
| 2004/0162903 | A1 | 8/2004 | Oh |
| 2004/0172410 | A1 | 9/2004 | Shimojima et al. |
| 2004/0205830 | A1 | 10/2004 | Kaneko |
| 2004/0212640 | A1 | 10/2004 | Mann et al. |
| 2004/0216173 | A1 | 10/2004 | Horoszowski et al. |
| 2004/0236844 | A1 | 11/2004 | Kocherlakota |
| 2004/0255249 | A1 | 12/2004 | Chang et al. |
| 2005/0021398 | A1 | 1/2005 | McCleskey et al. |
| 2005/0027821 | A1 | 2/2005 | Alexander et al. |
| 2005/0038981 | A1 | 2/2005 | Connor et al. |
| 2005/0044058 | A1 | 2/2005 | Matthews et al. |
| 2005/0050462 | A1 | 3/2005 | Whittle et al. |
| 2005/0053356 | A1 | 3/2005 | Mate et al. |
| 2005/0055595 | A1 | 3/2005 | Frazer et al. |
| 2005/0060759 | A1 | 3/2005 | Rowe et al. |
| 2005/0097542 | A1 | 5/2005 | Lee |
| 2005/0114852 | A1 | 5/2005 | Chen et al. |
| 2005/0132351 | A1 | 6/2005 | Randall et al. |
| 2005/0138560 | A1 | 6/2005 | Lee et al. |
| 2005/0198584 | A1 | 9/2005 | Matthews et al. |
| 2005/0204046 | A1 | 9/2005 | Watanabe |
| 2005/0216851 | A1 | 9/2005 | Hull et al. |
| 2005/0227621 | A1 | 10/2005 | Katoh |
| 2005/0229118 | A1 | 10/2005 | Chiu et al. |
| 2005/0246369 | A1 | 11/2005 | Oreizy et al. |
| 2005/0251833 | A1 | 11/2005 | Schedivy |
| 2005/0283791 | A1 | 12/2005 | McCarthy et al. |
| 2005/0288999 | A1 | 12/2005 | Lerner et al. |
| 2006/0011371 | A1 | 1/2006 | Fahey |
| 2006/0031381 | A1 | 2/2006 | Van Luijt et al. |
| 2006/0050970 | A1 | 3/2006 | Gunatilake |
| 2006/0051055 | A1 | 3/2006 | Ohkawa |
| 2006/0095401 | A1 | 5/2006 | Krikorian et al. |
| 2006/0095471 | A1 | 5/2006 | Krikorian et al. |
| 2006/0095472 | A1 | 5/2006 | Krikorian et al. |
| 2006/0095942 | A1 | 5/2006 | Van Beek |
| 2006/0095943 | A1 | 5/2006 | Demircin et al. |
| 2006/0107226 | A1 | 5/2006 | Matthews et al. |
| 2006/0117371 | A1 | 6/2006 | Margulis |
| 2006/0146174 | A1 | 7/2006 | Hagino |
| 2006/0280157 | A1 | 12/2006 | Karaoguz et al. |
| 2007/0003224 | A1 | 1/2007 | Krikorian et al. |
| 2007/0005783 | A1 | 1/2007 | Saint-Hillaire et al. |
| 2007/0022328 | A1 | 1/2007 | Tarra et al. |
| 2007/0074115 | A1 | 3/2007 | Patten et al. |
| 2007/0076604 | A1 | 4/2007 | Litwack |
| 2007/0168543 | A1 | 7/2007 | Krikorian et al. |
| 2007/0180485 | A1 | 8/2007 | Dua |
| 2007/0198532 | A1 | 8/2007 | Krikorian et al. |
| 2007/0234213 | A1 | 10/2007 | Krikorian et al. |
| 2007/0286596 | A1 | 12/2007 | Lonn |
| 2008/0019276 | A1 | 1/2008 | Takatsuji et al. |
| 2008/0037573 | A1 | 2/2008 | Cohen |

OTHER PUBLICATIONS

USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
European Patent Office, European Search Report, mailed Sep. 28, 2009 for European Application No. EP 06 78 6175.
International Search Report for PCT/US2008/069914 mailed Dec. 19, 2008.
PCT Partial International Search, PCT/US20091054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Srisuresh, P. et al. "Traditional IP Network Address Translator (Traditional NAT)," Network Working Group, The Internet Society, Jan. 2001.

Conway, Frank et al. "Systems and Methods for Creating Variable Length Clips from a Media Stream," U.S. Appl. No. 12/347,465, filed Dec. 31, 2008.
Thiyagarajan, Venkatesan et al. "Always-On-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
China State Intellectual Property Office "First Office Action," issued Jul. 31, 2009, for Application No. 200580026825.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
UsSPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/1550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.

European Patent Office, International Searching Authority, "International Search Report," for International Application No. PCT/US2009/049006, mailed Sep. 11, 2009.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01 &pagetype+printer§ion+1053801318705&path +articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.

Kulkarni, Anant Madhava "Systems and Methods for Creating Logical Media Streams for Media Storage and Playback," U.S. Appl. No. 12/323,907, filed Nov. 26, 2008.

Krikorian, Blake Gary et al. "Systems and Methods for Projecting Images From a Computer System," U.S. Appl. No. 12/408,460, filed Mar. 20, 2009.

Krikorian, Blake Gary et al. "Systems and Methods for Presenting Media Content Obtained From Multiple Sources," U.S. Appl. No. 12/408,456, filed Mar. 20, 2009.

International Search Report and Written Opinion for International Application No. PCT/US2008/080910, mailed Feb. 16, 2009.

International Search Report and Written Opinion for International Application No. PCT/US2006/025911, mailed Jan. 3, 2007.

International Search Report for International Application No. PCT/US2007/063599, mailed Dec. 12, 2007.

International Search Report for International Application No. PCT/US2007/076337, mailed Oct. 20, 2008.

International Search Report and Written Opinion for International Application No. PCT/US2006/025912, mailed Jul. 17, 2008.

International Search Report for International Application No. PCT/US2008/059613, mailed Jul. 21, 2008.

Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.

Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.

Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control—Controlling-Your-Computer-With-a-Remote/?highlight=remote+control>; retrieved on Jan. 28, 2009.

Wikipedia "LocationFree Player" [Online], Sep. 22, 2007, XP002512400; retrieved from the Internet: <URL:http://en.wikipedia.org/w/index.php?title=LocationFree_Player&oldid=159683564>; retrieved on Jan. 28, 2009.

Sling Media Inc. "Slingbox User Guide" [Online] 2006, XP002512553; retrieved from the Internet: <URL:http://www.slingmedia.hk/attach/en-US_Slingbox_User_Guide_v12.pdf>; retrieved on Jan. 29, 2009.

Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].

European Patent Office, International Searching Authority, "International Search Report," mailed Mar. 30, 2010; International Application PCT/US2009/068468 filed Dec. 27, 2009.

USPTO Final Office Action mailed Mar. 3, 2010; U.S. Appl. No. 11/111,265, filed Apr. 21, 2005.

USPTO Final Office Action mailed Mar. 12, 2010; U.S. Appl. No. 11/620,711, filed Jan. 7, 2007.

USPTO Non-Final Office Action mailed Mar. 19, 2010; U.S. Appl. No. 11/147,664, filed Jun. 7, 2005.

USPTO Non-Final Office Action mailed Mar. 31, 2010; U.S. Appl. No. 11/620,707, filed Jan. 7, 2007.

USPTO Non-Final Office Action mailed Apr. 1, 2010; U.S. Appl. No. 12/237,103, filed Sep. 24, 2008.

Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.

China State Intellectual Property Office "Office Action" issued Mar. 18, 2010 for Application No. 200680022520.6.

China State Intellectual Property Office "Office Action" issued Apr. 13, 2010 for Application No. 200580026825.X.

Canadian Intellectual Property Office "Office Action" mailed Feb. 18, 2010 for Application No. 2569610.

European Patent Office "European Search Report," mailed May 7, 2010 for Application No. 06786174.0.

Margulis, Neal "Apparatus and Method for Effectively Implementing a Wireless Television System," U.S. Appl. No. 12/758,193, filed Apr. 12, 2010.

Margulis, Neal "Apparatus and Method for Effectively Implementing a Wireless Television System," U.S. Appl. No. 12/758,194, filed Apr. 12, 2010.

Margulis, Neal "Apparatus and Method for Effectively Implementing a Wireless Television System," U.S. Appl. No. 12/758,196, filed Apr. 12, 2010.

Kirkorian, Jason Gary et al. "Personal Media Broadcasting System with Output Buffer," U.S. Appl. No. 12/757,697, filed Apr. 9, 2010.

Tarra, Raghuveer et al. "Firmware Update for Consumer Electronic Device," U.S. Appl. No. 12/757,714, filed Apr. 9, 2010.

European Patent Office, European Search Report for European Application No. EP 08 16 7880, mailed Mar. 4, 2009.

MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US20081087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [052], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

Joonbok, Lee et al. "Compressed High Definition Television (HDTV) Over IPv6," Applications and the Internet Workshops; Saint Workshops; International Symposium, Phoenix, AZ, USA, Jan. 23-27, 2006.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.

* cited by examiner

SYSTEMS AND METHODS FOR LINKING MEDIA CONTENT

TECHNICAL FIELD

The following discussion generally relates to streaming media, and in particular relates to systems, devices and techniques for processing linked media streams.

BACKGROUND

Consumers are continually demanding increased flexibility in viewing streaming and other forms of media. Whereas television viewing traditionally involved watching imagery received on a broadcast signal on a conventional television set, modern media experiences allow media content to be provided via broadcast, cable, satellite, portable media (e.g., DVD) and other sources. Further, the Internet and other relatively high-bandwidth networks now allow media content to be streamed or otherwise delivered to any number of devices (e.g., wireless phones, computers and the like) that previously were not typically used for viewing media content. Consumers are therefore able to view media content on a wide variety of devices and in a wide variety of locations.

In addition to the increased availability and flexibility in viewing media content, consumers have recently expressed significant interest in creating "clips" of media content that can be shared with others. Such clips may include relatively short excerpts of viewed media content in a digital or other format that may be distributed via the Internet or another channel; a number of Internet services for uploading and sharing media clips have become very popular in recent years.

As media streaming, clipping, placeshifting and other forms of media viewing continue to evolve, a need has emerged for an interface that allows consumers to view multiple media files in a convenient and intuitive manner. These and other desirable features and characteristics will become apparent from the subsequent detailed description and the appended claims, taken in conjunction with the accompanying drawings and this background section.

BRIEF DESCRIPTION

According to various exemplary embodiments, systems and methods are described for presenting a plurality of media clips to a viewer using a media player device. In a first embodiment, a first media clip is displayed on the media player, and an indicator corresponding to a second media clip is provided during playback of the first media clip. In response to the viewer selecting the indicator, playback of the first media clip is suspended, and information is stored about the first media clip on the media player device. The second media clip can then be subsequently displaying on the media player device. After displaying the second media clip, the stored information can be retrieved, and playback of the first media clip can resume from the point that playback was previously interrupted.

Other embodiments provide a system for presenting a plurality of media clips to a viewer. The system comprises means for displaying a first one of the plurality of media clips and for providing an indicator corresponding to a second one of the plurality of media clips on the media player device during playback of one the first one of the plurality of media clips. A means for receiving a viewer input corresponding to the indicator from the viewer is also provided. The system additionally comprises a means for processing playback of the plurality of media clips, the controlling means comprising means for suspending playback of the first one of the plurality of media clips and for subsequently directing the display of the second one of the plurality of media clips on the media player device in response to the viewer input corresponding to the indicator. Various embodiments also comprise a means for storing information about the first one of the plurality of media clips on the media player device while the second one of the plurality of video clips is being displayed.

In still other embodiments, a device for presenting a plurality of media clips to a viewer is provided. The device suitably comprises a display, a digital storage medium, a user interface configured to accept inputs from the viewer, and a processor. The processor can be configured to present a first one of the plurality of media clips to the viewer on the display and to provide an indicator corresponding to a second one of the plurality of media clips on the media player device during playback of the first one of the plurality of media clips, and, in response to the inputs from the viewer indicating a selection of the indicator, to suspend playback of the first one of the plurality of media clips, to store information about the first one of the plurality of media clips on the digital storage medium and to subsequently present the second one of the plurality of media clips on the display.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary media player;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

According to various embodiments, the viewer experience is improved by providing media clips that are interconnected by a hyperlink or the like so that the viewer is able to readily navigate between the various clips. In some embodiments, an indicator associated with a second clip is presented while the viewer is watching a first clip. When the viewer clicks or otherwise activates the indicator, the viewing context switches from the first clip to the second clip. That is, viewing of the first clip can be temporarily suspended while the second clip is viewed. Information about the first clip is stored while the second clip is played, therefore allowing convenient restoration of the first clip after the second clip is finished, or after the viewer navigates back to the first clip from the second. This allows the viewer to "browse" through video clips in a manner similar to browsing of web pages or the like, thereby providing a convenient and intuitive interface to the viewer.

Figure 1:
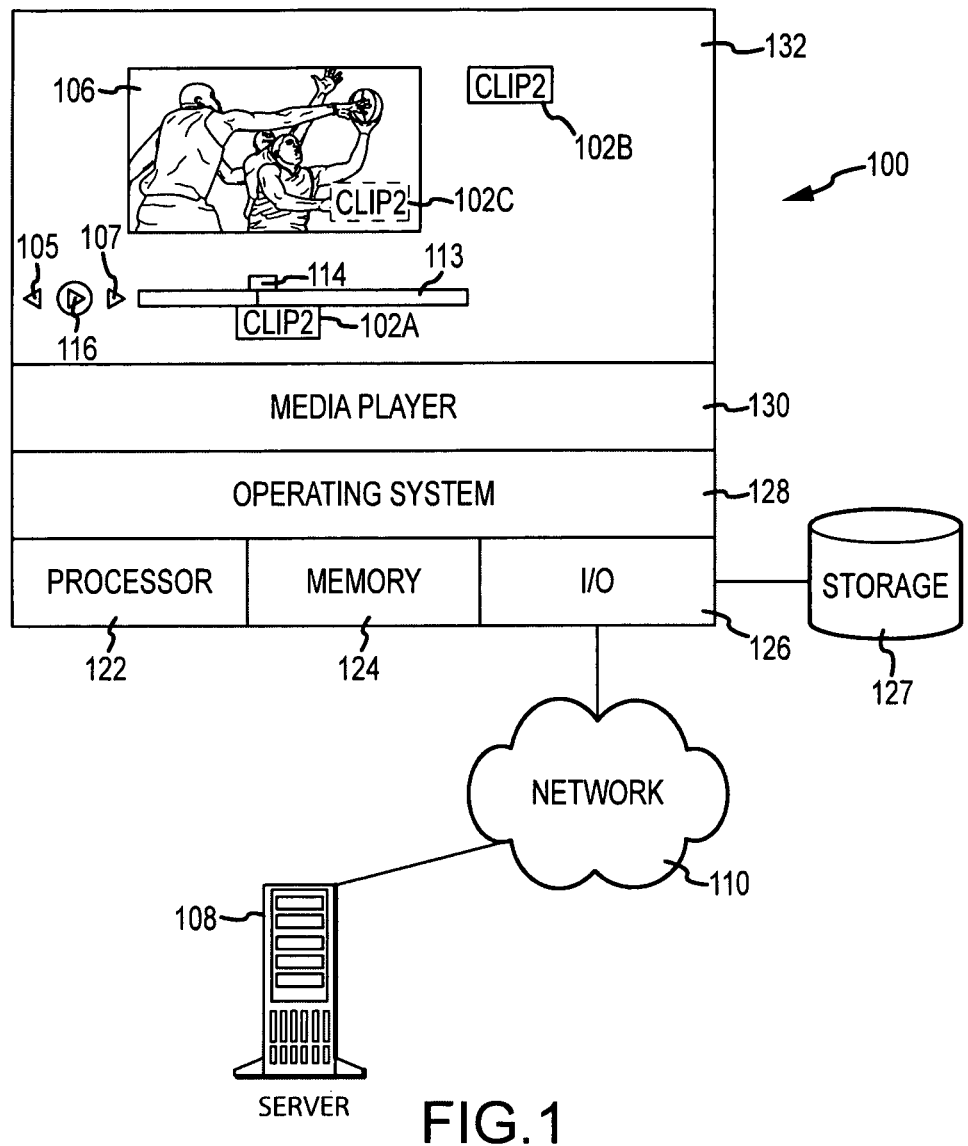

With reference now to FIG. 1, media player 100 is any device, system or module capable of playing media clips received from any source. Clips may be received from any source, such as a local storage medium 127 and/or a server 108 located across a digital network 110. Clips are rendered on a display 132 using various hardware and software features as appropriate. As noted above, multiple clips may be inter-linked in any manner to allow browsing between clips through navigation of links associated with each clip.

In various embodiments, media player 100 is implemented with any sort of conventional computer system or similar workstation, such as any sort of desktop, laptop or other personal computer or general-purpose computing system. In other embodiments, media player 100 is a set-top box (STB) or other receiver device capable of receiving television or other media signals via any sort of broadcast, cable, satellite or other medium. In still other embodiments, media player 100 may be a portable self-contained computing device such as any sort of wireless phone, personal digital assistant (PDA), network client and/or the like. Alternatively, media player 100 is a logical application or other module implemented in software or firmware that can be executed on any sort of processing hardware, including any sort of web or other network client. Media player 100 as described herein therefore represents any device, logic or other system capable of receiving a media clips from any local or remote source and of playing media clips for one or more viewers.

"Clips", as used herein, refers to any audio, video, audio/video or other media content received from any source, and in any format. In various embodiments, "clips" are simply streaming or file-based digital media content in any format that can be retrieved from server 108 or another source via a digital communications network 110 or the like. In embodiments wherein media player 100 is a television receiver such as a STB, for example, media clips may be received directly from a satellite, cable, broadcast or other source. In such embodiments, media clips may be a received television signal or the like that is received and processed locally on media player device 102. Media clips may also represent a stream obtained from a DVD or other portable medium, and/or a media file stored at media player 100 in any format.

In some embodiments, media player 100 is able to create clips from any source. Sources of clipped content could include any digital or analog programming stream, including any stream received from a broadcast source (e.g., a satellite, terrestrial broadcast and/or cable source), digital video recorder, placeshifting device, DVD or other portable media, network source, and/or the like. Clip creating may be provided by media player 130 or a separate editing application. In such embodiments, received media streams can be converted into shorter digital clips that can be shared with other viewers, e.g., using network 110. Clip creation features need not be provided in all embodiments, however.

In the exemplary embodiment shown in FIG. 1, media player 100 includes a processor 122, memory 124 and input/output features 126 commonly associated with any conventional computing platform. Processor 122, for example, may be any sort of microprocessor, microcontroller, digital signal processor, programmable array or other logic capable of executing instructions and processing data to implement the various features of the media player device. Memory 124 includes any sort of RAM, ROM, flash and/or other memory capable of storing instructions and data that can be processed by processor 122 or other processing logic as appropriate. Input/output 126 typically includes any conventional interfaces to input devices (e.g., keyboard, mouse, trackball, joystick, directional pad, touchpad/touchscreen, wireless or other remote control, and/or other input devices as appropriate), as well as any conventional interfaces to output devices such as a display 132 or the like. Input/output 126 typically also includes interfaces to any sort of mass storage 127 (e.g., a magnetic or optical disk) and/or to a communications network 110. Network interfaces used in various embodiments might include any sort of wired (e.g., IEEE 802.3 "ETHERNET") or wireless (e.g., IEEE 802.11 "Wi-fi") interfaces, including any sort of interfaces to telephone networks.

Any of the various features of media player 100 may be implemented with any sort of general or special purpose hardware, software and/or firmware, as appropriate. In some embodiments (e.g., embodiments wherein media player 100 is implemented as a STB or other media receiver), processor 122, memory 124 and/or input/output 126 may be implemented as a "system on a chip" (SoC) using any suitable processing circuitry under control of any appropriate control logic. In various embodiments, such control logic may execute within an integrated SoC or other processor to implement a media receiver, decoder, display processor and/or any other features as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the various functions and features described herein. In still other embodiments, processor 122 and/or any other features may be implemented with an application specific integrated circuit (ASIC) or the like.

To that end, operations of device 102 may be controlled by any sort of general purpose or other operating system 128. Operating system 128 typically implements user interface features and also allows programs (e.g., media player application 130) to use the various hardware and other resources of device 102. Examples of operating systems that could be used in various embodiments include any of the well-known operating systems conventionally used in personal computing (e.g., any version of WINDOWS, MacOS/OSX, LINUX OS, etc.) or mobile computing (e.g., any version of BLACKBERRY, ANDROID, WINDOWS MOBILE, SYMBIAN, iPHONE and/or any other operating system). The particular examples of operating systems are not intended to be limiting; indeed, other embodiments could be based upon other operating systems, including any sort of proprietary operating system, and equivalent embodiments could be based upon any sort of programming or other abstraction environment (e.g., JAVA, .NET, and/or the like) in place of or in addition to a conventional operating system 128.

Media player application 130 is any program, application, applet, browser plugin, software module and/or other logic capable of decoding one or more clips for playback on display 132 or the like. Media player application 130 may be implemented in any programming language, and may be stored in source or object code format in any storage medium, including memory 124 and/or any sort of disk or other mass storage available to media player 100. In an exemplary implementation, media player application 130 is a software program that is stored in object code form on a disk or similar medium until being activated by the user. The program 130 is then partially or wholly duplicated into memory 124 to facilitate execution of the object code instructions by processor 122.

Display 132 is any sort of television, monitor or other display capable of presenting imagery to the viewer. In various embodiments, display 132 is a conventional television or computer monitor associated with media player 100, including any sort of integrated or external display 132 that might be associated with a computer, wireless phone, PDA or the like. In other embodiments, display 132 is a conventional analog or digital television that may be coupled to a STB or other receiver, as described above. Display 132 need not be physically present at the same location as media player 100 in all embodiments; to the contrary, content may be provided from media player 100 to display 132 via any sort of cabling, network (e.g., network 110) or the like.

Network 110 is any digital or other communications network capable of transmitting messages between senders and receivers. In various embodiments, network 110 may encompass one or more wide area networks, local area networks, and/or any combination of wide and local area networks, including any sort of wireless or other telephone networks. Network 110 can include any number of public or private data connections, links or networks supporting any number of communications protocols. Network 110 may include the Internet, for example, or any other network based upon TCP/IP or other conventional protocols. In many embodiments, network 110 may also include one or more conventional local area networks, such as one or more IEEE 802.3 and/or IEEE 802.11 networks. Network 110 may also incorporate any sort of wireless telephone network, such as any sort of GSM/EDGE or CDMA/EVDO connection, any sort of 3G or subsequent telephone link, and/or the like. Network 110 as shown in FIG. 1, then, is intended to broadly encompass any digital communications network(s), systems or architectures for transmitting data between the various components of system 100.

Server 108 is any conventional network server that is able to receive and/or provide one or more media clips on network 110. In various embodiments, server 108 is a media server that distributes media clips to various media players 100 over network 110. In various further embodiments, server 108 also receives media clips that are created by viewers using media players 100 or the like. In such embodiments, viewers are able to create custom-made clips from broadcast or other content and to share their clips with friends or others. Clips may be provided from server 108 in any sort of file-based and/or streaming format, such as any sort of formatting based upon WINDOWS MEDIA, QUICKTIME, REAL MEDIA, FLASH, SHOCKWAVE and/or other products.

The viewer is able to interact with media player application 130 using the interface features of display 132 in any manner. In various embodiments, the viewer is able to select the buttons, icons, sliders and/or other interface features presented on display 132 using conventional keyboard, mouse, and/or other interface hardware that may be available. Other embodiments may provide a wireless remote control or the like, or any other interface feature supported by media player 100. In an exemplary embodiment, the viewer is able to select and manipulate icons, sliders, buttons and/or other interface elements on display 132 through movement and selection of a cursor or other conventional interface feature using a mouse or other multi-dimensional input device. Such features are commonly supported by various operating systems 128, hardware drivers (e.g., input/output features 126) and/or the like.

In the exemplary embodiment shown in FIG. 1, media player 100 is able to present a clip 106 on display 132 for the viewer. The clip 106 is presented in conjunction with an appropriate user interface that incorporates buttons, icons and/or other features that allow for navigation and control of the viewer experience. For example, the exemplary interface shown in FIG. 1 includes a Play button 116 that allows the viewer to play or pause the presentation of the media clip 106, as well as a time shift buffer indicator 113 that displays the current playback position within the clip. A slider 114 is also provided in this example that allows the viewer to move within the time shift buffer to change the playback position of the clip. That is, the slider 114 moves with respect to the time shift buffer indicator 113 to "fast forward" or "rewind" the playback of the media clip 106. Other embodiments may equivalently provide buttons, icons or other features in place of slider 114 or buffer indicator 113, or any of the other particular imagery and interface elements shown in FIG. 1. Further, various embodiments may provide additional features not shown in FIG. 1. Some embodiments may allow viewers to record "mark points" or the like, for example, on or near the time shift buffer indicator 113 to provide a convenient reference for later re-viewing of one or more scenes. Still other embodiments may allow editing of the clip, or "sub-clipping" (e.g., creation of new clips from the existing clip). For example, start and end points of a sub-clip may be defined with respect to the time shift buffer or the like.

While a first clip 106 is playing, indicators 102 for other clips may be presented in any manner. In various embodiments, indicators 102 are simply icons, buttons or other interface features that can be clicked or otherwise actuated to present a different clip to the viewer. This second clip may be interlinked to the first clip in any manner, as described more fully below. When the viewer selects indicator 102, the viewing experience changes to that of the second clip. Information about the first clip can be stored (e.g., in memory 124 and/or storage 127) for subsequent retrieval, and the second clip is played for the viewer. After viewing of the second clip is complete (e.g., the clip is finished, or the viewer indicates a desire to stop viewing the clip), viewing of the first clip can be restored, as described more fully below.

To that end, contextual information about the first clip can be stored before (or while) the subsequent clip is presented, thereby allowing the viewer to restore the original context at a later time. Contextual information may include some or all of the contents of the time shift buffer (including any mark points, sub-clip start/end points, editing information and/or the like). This information may be stored in memory 124, storage 127 or another suitable location so that the viewer is able to return to the same viewing context that was displayed before navigating to the subsequent clip.

By storing context information about clips as subsequent clips are selected, navigation or "browsing" between clips can be facilitated. To that end, display 132 as shown in FIG. 1 includes two browsing indicators 105, 107 that allow reverse or forward navigation, respectively, between clips. By selecting indicator 105, for example, the viewer is able to revert to the previously-viewed clip. After reverting to a previously-viewed clip, indicator 107 can be selected to move "forward" in the linked chain of video clips, as appropriate. Any number of clip contexts may be stored in any sort of linear or other chain to allow backward and/or forward browsing through the various clip contexts, as desired.

Indicators 102 associated with other clips may be presented in any manner. In various embodiments, indicators 102 are simply presented within imagery presented on display 132 to allow for selection of a subsequent clip. Indicator 102B, for example, shows an icon or other indicator that can be selected to bring up a second clip at any time during viewing of the present clip. Clips may be selected from indicators 102C that overlie or are otherwise located within the displayed imagery of the current clip 106 in some embodiments. To that end, indicators 102A-C may be presented in any location and at any time during viewing of clip 106, as appropriate.

In the example of FIG. 1, indicator 102A is shown proximate to the time shift buffer indicator 113 to indicate a clip that may correspond to the particular content of the presently-viewed clip at the time indicated in the time shift buffer. If a particular product is being shown or discussed during a portion of the present clip, for example, indicator 102B may provide a link to a second clip that provides more information about that product for that portion of the clip. Indicator 102A may therefore be presented when the playback of the first clip (as indicated by the position of slider 114) is within the portion of the time shift buffer 113 that corresponds to the particular time that the content of the second clip is most relevant. Indicators corresponding to other clips may be presented at other times, and/or no indicators to other clips may be provided at certain times during playback of the first clip, as desired.

Indicators 102A-C that allow the viewer to quickly access other media clips may therefore be provided in any manner. As a first clip is presented to the viewer, the indicators 102A-C may be presented at times and locations on display 132 that are convenient and logical for providing access to additional clips. Upon selection of one or more indicators 102A-C, the subsequent clip is presented, and information about the first clip (e.g., the contents of the time shift buffer, an indication of the point in the clip when viewing was suspended, and/or other information) is stored for subsequent viewing of the first clip.

Clips may be inter-linked in any manner. In some embodiments, linking information about subsequent clips is provided in metadata associated with the first clip to facilitate a clip browsing experience that is both familiar and convenient to the viewer. Metadata associated with the first clip can contain information 200 that identifies subsequent clips, and provides sufficient information to media player 100 to allow displaying and selection of the clips in a manner intended by the clip creator.

Figure 2:
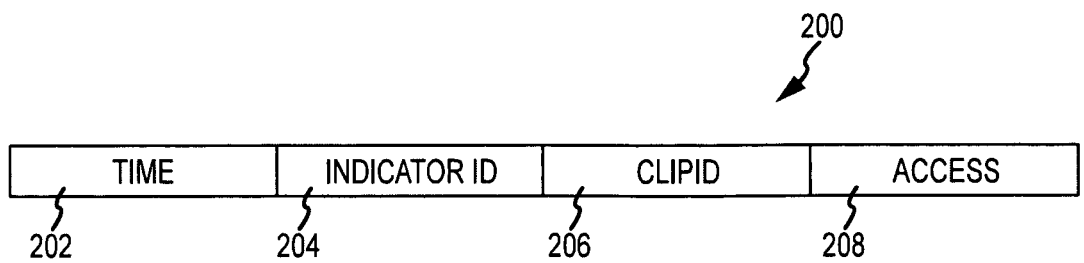
FIG. 2 is a block diagram of an exemplary metadata structure.

FIG. 2 shows an exemplary structure for linking clips to each other. In various embodiments, information 200 is stored in metadata of the first clip that allows for linking to the second clip. Such information 200 may include such features as a time 202 that the indicator 102 is presented, an identification 204 of the indicator 102, an identification 206 of the second clip itself, and/or any access restrictions 208 placed on the subsequent clip. By providing this information with the first clip, a second clip can be conveniently linked to the second clip to allow for sequential or other viewing of the related clips.

Time information 202 is any indication of a time in the first clip that the indicator for the second clip may be active. Information 202 may include a start time, an end time, or both starting and ending times to define those times during playback that the indicator 102 for the clip is active. Multiple times or time ranges may be defined in some embodiments, thereby allowing the indicator 102 to be displayed at multiple points during playback of the first clip. Timing information may not be present in all embodiments; in such cases, indicator 102 may be presented throughout the duration of the first clip, or other default-type actions may be taken.

Identification 204 of the indicator 102 may be provided in any manner. In various embodiments, identification 204 includes data that describes the icon or other graphical imagery for indicator 102. This information may be defined in any manner. In various embodiments, indictor 102 is simply provided as a JPEG, TIFF, PNG or other image. Other embodiments may provide a uniform resource locator (URL) or other address/link to additional information. In still other embodiments, a reference to a video frame or other source of imagery for indicator 102 may be provided. Alternatively, textual or numerical information may be provided that allows the media player 100 to generate a suitable indicator 102.

Clip identification 206 is any information capable of identifying the second clip. Such information may include a URL or other address of the clip (e.g., a location on network 110 where the clip may be obtained), or may include the clip itself in some embodiments.

Some clips may be associated with access restrictions 208 and/or other limits upon viewing. Clips may be restricted based upon time of day, dates of availability, and/or other factors as appropriate. In some embodiments, certain clips can be access restricted to allow for distribution only to limited groups (e.g., members of a "friends" group or to viewers who have entered appropriate userid/password pairs or other credentials). Any information 208 relating to viewing restrictions, access controls or the like can be incorporated into metadata 200 for processing by media player 100 as appropriate.

The information provided in metadata 200 may be created and formatted in any manner. In various embodiments, a clip author is able to provide information within structure 200 using an authoring tool, or any sort of manual entry, or any combination of the two. In various embodiments, media player application 130 includes the ability to create media clips from received media streams, as described above; this functionality can be enhanced to allow the inter-linking of additional clips as described herein. A clip creation tool, for example, may include options to add references to additional clips that can be linked from the created clip. Such tools may simply request a URL or other address of the created clip, as appropriate, or may provide any sort of "drag and drop" or other convenient graphical mechanism for inter-linking multiple clips. Start and end times for presenting the indicator 102 (as well as any other parameters) may be defined manually, graphically or otherwise. Start and end times could be selected from points on the time shift buffer indicator 113 associated with the primary clip, for example. Any additional information (e.g., relating to a display location for the indicator 102) could also be provided as desired.

Figure 3:
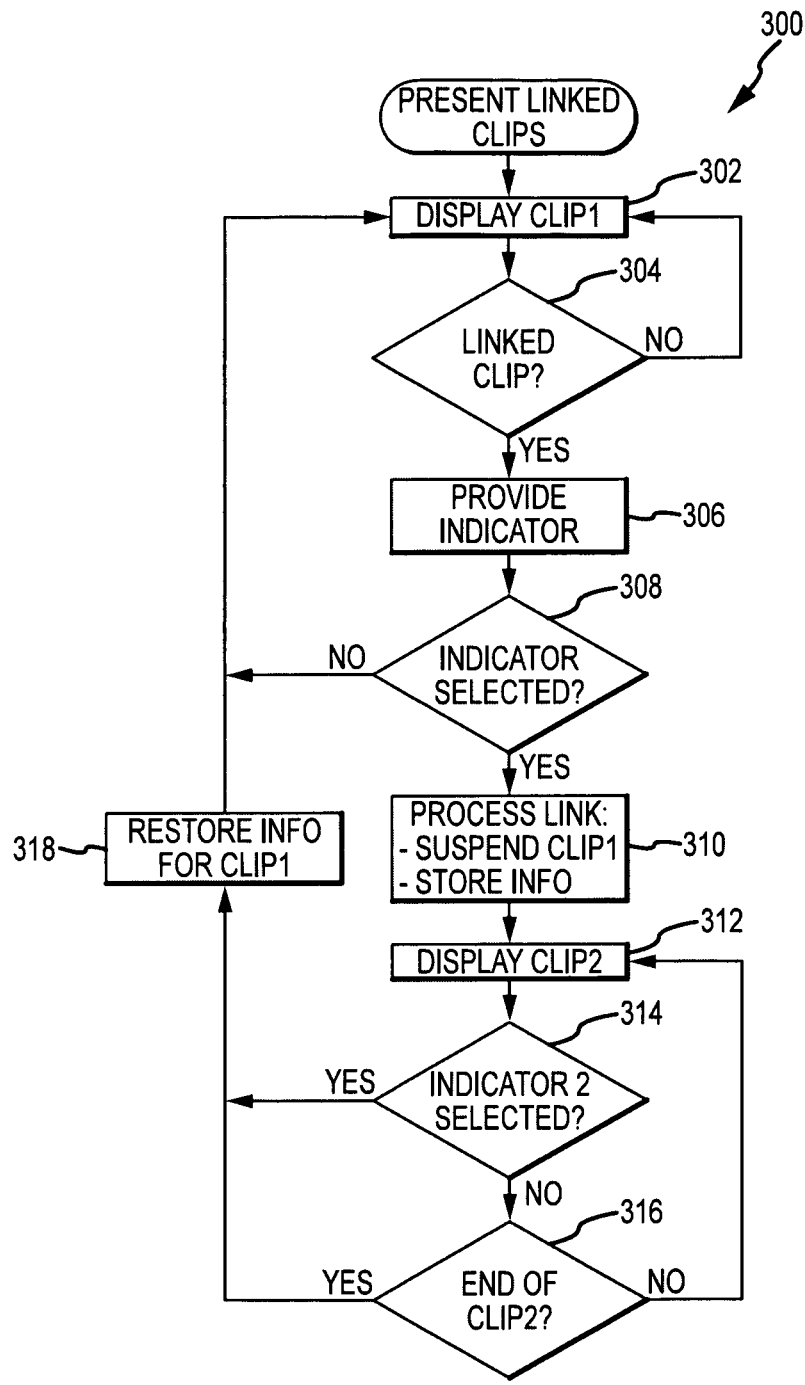
FIG. 3 is a flowchart of an exemplary method for presenting multiple interlinked media clips.

Turning now to FIG. 3, an exemplary process 300 that may be executed at media player 100 suitably involves the broad steps of displaying a first media clip on the media player device (function 302), providing an indicator 102 corresponding to a second media clips during playback of the first media clip (function 306), and in response to the viewer selecting the indicator (function 308), suspending playback of the first media clip and storing information about the first media clip on the media player device (function 310). The second media clip can be subsequently displayed on the media player device (function 312) as appropriate.

Generally speaking, each of the method steps shown in FIG. 3 may be implemented in software or firmware that may be stored in memory, mass storage or any other storage medium available to the executing device, and that may be executed on any processor or control circuitry associated with the executing device. For example, the various functions shown in FIG. 3 may be implemented in software or firmware that can be stored in memory 124 and/or storage medium 127 and executed by processor 122. The particular logic shown in FIG. 3 may be modified or enhanced in any manner, and any other components, systems, logic or devices may be involved in various other embodiments as appropriate.

Media clips may be displayed in any manner (function 302). As noted above, clips may be rendered by media player application 130 and presented on display 132 associated with media player 100 in any manner. Displaying may be initiated in response to inputs (e.g., from "play" button 116) provided by the viewer using a graphical or other user interface. The media clip is then rendered (e.g., by processor 122 operating in conjunction with decoder software in media player application 130 or the like) and displayed as appropriate.

The displayed media clip may have any number of associated clips that are interlinked through metadata or the like. If links are present (function 304), indicators 102 for the linked clips can be presented (function 306) on display 132 while the clip is being displayed. As noted above, metadata 200 associated with the displayed clip can describe appropriate times during playback that the indicator 102 is active, and/or any other parameters as desired. That is, indicator 102 may be active during particular times during playback or the like, and may also be activated/deactivated in response to access controls, temporal constraints, available hardware or software, or other parameters as desired. These parameters may be defined within metadata 200 that accompanies the primary clip.

When the viewer selects an indicator 102 (thereby indicating a desire to view a secondary media clip that is associated with the indicator 102), the linked clip is processed as appropriate (function 310). In various embodiments, playback of the primary media clip is paused or otherwise suspended, and some or all of the contents of the time shift buffer associated with the primary clip are stored (e.g., in memory 124 and/or storage 127) for later retrieval. In other embodiments, a time marker that indicates a time that the playback was interrupted may be stored to facilitate later playback of the first clip from the same point that playback was previously left off. Other embodiments may additionally store metadata, viewer settings and/or other contextual information associated with the viewing of the first media clip.

Information for multiple clips can be stored for later retrieval (e.g., using the back button 105 and/or forward button 107 described above). Indeed, any number of additional clip contexts can be stored, so long as the amount of available memory or other storage space is not exceeded. To that end, some embodiments may impose a limit on the number of contexts/information that can be stored to prevent excessive memory or other storage consumption by such information.

After storing information associated with the primary media clip, the secondary clip associated with the selected indicator 102 can be presented on display 132 (function 312). At this point, the second clip can effectively function as the primary clip described above, with additional links/indicators 102 processed as appropriate to facilitate a multi-link chain of video clips. That is, the viewer may be presented with additional indicators 102 for additional clips that have not yet been presented based upon metadata 200 associated with the second clip.

Further, the viewer may be able to navigate back to the original clip by selecting an appropriate icon, button or other indicator 102 on display 132 (function 314). The indicator may simply be the "back" button 105 described above, or may be another indicator 102 presented elsewhere on display 132 as desired.

If the second clip terminates without the viewer selecting a link to a third clip, then any appropriate default action may be taken (function 316). In an exemplary embodiment, the media player application 130 simply waits for additional instruction before proceeding. In other embodiments, the viewing context for the previous clip can be restored, or any other action can be taken as desired.

Viewing of the original clip can be restored in any manner (function 318). In various embodiments, the time shift buffer or other information previously stored (e.g., in function 310) can be retrieved from memory 124, storage 127 or any other location, and the viewing context for the original clip can continue. If the point at which viewing was previously suspended was recorded, playback of the original clip can continue at that same point, as desired. Other information from the previous viewing context (mark points, viewer settings, preferences, etc.) may also be retrieved to preserve the original viewing context as accurately as possible.

The basic functionality described in FIG. 3 can be supplemented in any number of ways. The particular clips that are linked to each clip, for example, may be manually or automatically selected in any manner. Automatic selection may take place, for instance, in response to keywords entered by any number of authors, editors and/or viewers, thereby allowing clips with common keywords or other descriptors to be linked together. Clips can be associated based upon commercial relationships or other factors (e.g., an advertisement clip can be linked to a primary clip to allow for selective viewing of the advertisement). Still further, clips can be associated with each other based upon the contents of the clips, as noted above. If an actor in a primary clip is visiting a museum or other attraction, for example, a secondary clip providing more information about the attraction can be linked to the primary clip, with the indicator 102 associated with the second clip being visible during the portions of the primary clip where the attraction is discussed or described. Similar features could be used with product placement, advertisements, or simply to provide clips with common content and to associate the content of the current clip with content of the linked clips.

Again, the concepts described herein could be readily and equivalently applied to any type of video, audio or other media files, including files provided in any sort of streaming or file based format, as well as terrestrial or satellite broadcasts, cable transmissions, signals obtained from DVD or other recorded media, and/or the like.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method for browsing between a plurality of media clips each comprising motion video presented to a viewer using a media player device, wherein the plurality of media clips comprises a first media clip and a second media clip, the method comprising:

displaying the first media clip in a first viewing context on the media player device, wherein the first media clip is stored in a first time shift buffer;

during playback of the first one of the plurality of media clips from the first time shift buffer, providing an indicator corresponding to a second one of the plurality of media clips on the media player device;

in response to the viewer selecting the indicator, suspending the playback of the first one of the plurality of media clips from the first time shift buffer, storing context information describing the first viewing context on the media player device, and subsequently replacing the first viewing context with a second viewing context that plays back the second media clip on the media player device from a second time shift buffer that is separate from the first time shift buffer; and in response to a subsequent input from the viewer during the playback of the second video clip in the second video context, retrieving the stored context information describing the first viewing context, restoring the first time shift buffer containing the first media clip on the media player device from the stored context information, and continuing playback of the first one of the plurality of media clips in the first viewing context on the media player device from the first time shift buffer to thereby allow the viewer to sequentially browse between playback of the first media clip from the first time shift buffer and playback of the second media clip from the second time shift buffer on the media player device.

2. The method of claim 1 wherein the context information about the playback state of the first media clip comprises the contents of the first time shift buffer and wherein the first time shift buffer is used to support fast forward and rewind operations during playback of the first media clip, and wherein the restoring comprises restoring the contents of the first time shift buffer after playback of the second media clip to thereby restore the fast forward and rewind operations during the continuing playback of the first media clip.

3. The method of claim 1 wherein the stored context information about the first one of the plurality of media clips comprises a time indicator corresponding to the point in the first one of the plurality of media clips when playback from the first time shift buffer was suspended, and wherein the continuing playback of the first media clip is restored from the point in the first time shift buffer when playback was previously suspended.

4. The method of claim 1 wherein the restoring comprises restoring the contents of the first time shift buffer after playback of the second media clip to thereby restore the fast forward and rewind operations during the continuing playback of the first media clip.

5. The method of claim 1 wherein the indicator is provided only during a portion of the playback of the first one of the plurality of media clips.

6. The method of claim 5 wherein the second one of the plurality of media clips is selected based upon the content of the first one of the plurality of media clips during the portion of the playback that the indicator is provided.

7. The method of claim 1 further comprising displaying time shift imagery on the media player device that corresponds to the first time shift buffer that is navigable by the viewer to play a portion of the first one of the plurality of media clips.

8. The method of claim 7 wherein the indicator is provided proximate the time shift imagery when content of the first one of the plurality of media clips corresponds to the content of the second one of the plurality of media clips.

9. The method of claim 7 wherein the information stored about the first one of the plurality of media clips comprises the contents of the first time shift buffer.

10. The method of claim 9 wherein the restoring comprises restoring the contents of the first time shift buffer to thereby resume playing of the first one of the plurality of media clips.

11. The method of claim 10 wherein the subsequent input from the viewer comprises a viewer selection of a second indicator displayed with the second one of the plurality of media clips.

12. The method of claim 1 further comprising processing metadata associated with the first one of the plurality of media clips, wherein the metadata comprises identification information about the second one of the plurality of media clips.

13. The method of claim 12 wherein the identification information comprises the indicator.

14. The method of claim 12 wherein the identification information comprises timing information that identifies a portion of the first one of the plurality of media clips when the indicator is visible to the viewer.

15. The method of claim 12 wherein the identification information comprises the indicator, timing information that identifies a portion of the first one of the plurality of media clips when the indicator is visible to the viewer, and linking information identifying a location of the second one of the plurality of media clips.

16. A system for presenting a plurality of media clips comprising moving video to a viewer, the system comprising:

means for displaying a first one of the plurality of media clips and for providing an indicator corresponding to a second one of the plurality of media clips on the media player device during playback of one the first one of the plurality of media clips from a first time shift buffer;

means for receiving a viewer input corresponding to the indicator from the viewer; and means for processing playback of the plurality of media clips, wherein the processing means is configured to suspend playback of the first one of the plurality of media clips in response to the viewer input corresponding to the indicator, to direct the storage of context information about a first viewing context of the first one of the plurality of media clips comprising the first time shift buffer, to subsequently direct the displaying means to replace the first viewing context of the first one of the plurality of media clips with a second viewing context displaying the second one of the plurality of media clips from a second time shift buffer on the media player device in response to the viewer input corresponding to the indicator, and, in response to subsequent input from the viewer, to retrieve the stored context information about the first one of the plurality of media clips and to restore the first viewing context of the first one of the plurality of media clips from the stored context information to thereby allow for continued playback of the first one of the plurality of media clips and to thereby allow the viewer to sequentially browse between playback of the first media clip from the first time shift buffer and playback of the second media clip from the second time shift buffer on the media player device; and means for storing the context information about the first one of the plurality of media clips on the media player device while the second one of the plurality of video clips is being displayed.

17. The system of claim 16 wherein the context information about the first viewing context of the first media clip comprises a time indicator corresponding to a point in the first one of the plurality of media clips when playback is suspended, and wherein the processing means is further configured to process the time indicator from the restored context information to thereby restore playback of the first media clip from the point when playback was previously suspended.

18. The system of claim 16 wherein the context information about the first viewing context of the first media clip comprises the contents of the first time shift buffer used to support fast forward and rewind operations during playback of the first media clip, and wherein the processing means is further configured to restore the contents of the first time shift buffer after playback of the second media clip to thereby restore the fast forward and rewind operations during the continuing playback of the first media clip.

19. The system of claim 18 wherein the processing means is further configured to provide the indicator proximate the time shift imagery when content of the first one of the plurality of media clips corresponds to content of the second one of the plurality of media clips.

20. The system of claim 18 wherein the context information stored about the first one of the plurality of video clips comprises the contents of the first time shift buffer.

21. A device for presenting a plurality of media clips each comprising moving video to a viewer, the device comprising:
 a display;
 a digital storage medium;
 a user interface configured to accept inputs from the viewer; and
 a processor configured to present a first one of the plurality of media clips to the viewer on the display in a first viewing context comprising a first time shift buffer and to provide an indicator corresponding to a second one of the plurality of media clips on the media player device during playback of the first one of the plurality of media clips, and, in response to the inputs from the viewer indicating a selection of the indicator, to suspend playback of the first one of the plurality of media clips from the first time shift buffer in the first viewing context, to store information about the first viewing context on the digital storage medium and to subsequently present the second one of the plurality of media clips on the display from a second time shift buffer in a second viewing context that replaces the first viewing context, and, in response to subsequent input from the viewer, to retrieve the stored context information about the first viewing context and to restore the first viewing context from the stored context information to thereby allow for continued playback of the first one of the plurality of media clips from the first time shift buffer and to thereby allow the viewer to sequentially browse between playback of the first media clip from the first time shift buffer and playback of the second media from the second time shift buffer on the media player device.

22. The device of claim 21 wherein the first viewing context comprises a time indicator corresponding to a point in the first one of the plurality of media clips when playback is suspended, and wherein the processor is further configured to process the time indicator from the restored context information to thereby restore playback of the first media clip from the point when playback was previously suspended.

23. The device of claim 21 wherein the processor is further configured to direct the display of time shift imagery on the display, wherein the time shift imagery corresponds to the first time shift buffer in the digital storage medium that is navigable by the viewer to play a portion of the first one of the plurality of media clips.

24. The device of claim 23 wherein the processor is further configured to provide the indicator proximate the time shift imagery when content of the first one of the plurality of media clips corresponds to content of the second one of the plurality of media clips.

25. The device of claim 23 wherein the information stored about the first viewing context comprises the contents of the first time shift buffer.

26. The device of claim 25 wherein the processor is further configured to restore the contents of the first time shift buffer to thereby resume playing of the first one of the plurality of media clips.

27. The device of claim 21 wherein the processor is further configured to process metadata associated with the first one of the plurality of media clips, wherein the metadata comprises identification information about the second one of the plurality of media clips.

28. The device of claim 27 wherein the identification information comprises the indicator, timing information that identifies a portion of the first one of the plurality of media clips when the indicator is visible to the viewer, and linking information identifying a location of the second one of the plurality of media clips.

\* \* \* \* \*